United States Patent
Guru et al.

(10) Patent No.: US 12,460,365 B2
(45) Date of Patent: Nov. 4, 2025

(54) EMITTER ARRAY FOR A LUNAR ROVER

(71) Applicant: GM GLOBAL TECHNOLOGY OPERATIONS LLC, Detroit, MI (US)

(72) Inventors: Satendra S. Guru, Owosso, MI (US); Felipe Cuellar-Ferreira, Madison Heights, MI (US); Babak Makkinejad, Troy, MI (US); Maria Rossana Ruiz, Detroit, MI (US); Douglas James Spry, Auburn Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 225 days.

(21) Appl. No.: 18/100,679

(22) Filed: Jan. 24, 2023

(65) Prior Publication Data

US 2024/0247455 A1    Jul. 25, 2024

(51) Int. Cl.
| | | |
|---|---|---|
| E02D 3/11 | (2006.01) | |
| B23K 26/06 | (2014.01) | |
| B23K 26/324 | (2014.01) | |
| G01N 21/21 | (2006.01) | |
| G01S 7/48 | (2006.01) | |
| G01S 17/08 | (2006.01) | |

(52) U.S. Cl.
CPC ............ *E02D 3/11* (2013.01); *B23K 26/0608* (2013.01); *B23K 26/324* (2013.01); *G01N 21/21* (2013.01); *G01S 7/4802* (2013.01); *G01S 17/08* (2013.01)

(58) Field of Classification Search
CPC ..... E02D 3/11; B23K 26/0608; B23K 26/324; G01N 21/21; G01S 17/08; G01S 7/4802; B64G 1/16; B64G 4/00
See application file for complete search history.

(56) References Cited

U.S. PATENT DOCUMENTS

| | | | | |
|---|---|---|---|---|
| 2008/0003133 | A1* | 1/2008 | Taylor | B64G 99/00 422/21 |
| 2022/0403740 | A1* | 12/2022 | Kotenberg | E21B 41/00 |
| 2024/0227442 | A1 | 7/2024 | Ruiz et al. | |
| 2024/0262533 | A1 | 8/2024 | Cuellar-Ferreira et al. | |

FOREIGN PATENT DOCUMENTS

| | | | |
|---|---|---|---|
| CN | 211492037 | * | 9/2020 |
| CN | 113863278 | * | 12/2021 |
| CN | 115015007 | * | 9/2022 |

OTHER PUBLICATIONS

Fischer, H.R., "In-situ resource utilization-feasibility of the use of lunar soil to create structures on the moon via sintering based additive manufacturing technology". Aeronautics and Aerospace Open Acces Journal, vol. 2 (Issue 4), pp. 243-248, published 2018.

* cited by examiner

*Primary Examiner* — Carib A Oquendo

(57) ABSTRACT

A lunar rover includes a lunar rover body, at least one wheel coupled with the lunar rover body, a drive module coupled with the at least one wheel, the drive module configured to drive rotation of the at least one wheel over a surface, an extension arm coupled to the lunar rover body, an emitter array coupled to the extension arm, and a controller electrically connected with the emitter array. The controller is configured to control the emitter array to emit at least one of laser electromagnetic waves or maser electromagnetic waves towards the surface to sinter lunar regolith particles on the surface.

15 Claims, 6 Drawing Sheets

EMITTER ARRAY FOR A LUNAR ROVER

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure generally relates to emitter arrays for lunar rovers, and more particularly, to a laser and/or maser emitter array used to sinter lunar regolith on a lunar surface.

SUMMARY

A lunar rover includes a lunar rover body, at least one wheel coupled with the lunar rover body, a drive module coupled with the at least one wheel, the drive module configured to drive rotation of the at least one wheel over a surface, an extension arm coupled to the lunar rover body, an emitter array coupled to the extension arm, and a controller electrically connected with the emitter array. The controller is configured to control the emitter array to emit at least one of laser electromagnetic waves or maser electromagnetic waves towards the surface to sinter lunar regolith particles on the surface.

In other features, the lunar rover includes a detector element configured to detect an amount of lunar regolith particles on the surface, wherein the controller is configured to determine whether the amount of lunar regolith particles detected by the detection element is greater than a sinter threshold value, activate the emitter array to sinter the lunar regolith particles in response to the amount of lunar regolith particles being greater than the sinter threshold value, and deactivate the emitter array to avoid sintering the lunar regolith particles in response to the amount of lunar regolith particles being less than the sinter threshold value.

In other features, the detector element includes a polarity detector configured to detect a polarity of the lunar regolith particles, and the controller is configured to determine the amount of lunar regolith particles according to the polarity of the lunar regolith particles detected by the polarity detector.

In other features, the detector element includes a lidar detector configured to emit light signals and determine an amount of reflected light that returns to the lidar detector, and the controller is configured to determine the amount of lunar regolith particles according to the amount of reflected light that returns to the lidar detector.

In other features, the emitter array includes multiple laser emitters configured to emit coherent light.

In other features, the multiple laser emitters are configured to emit light with at a power in a range of 15 KW to 50 kW.

In other features, the emitter array includes multiple maser emitters configured to emit electromagnetic waves have at least one of a microwave frequency, a radio frequency or an infrared frequency.

In other features, the multiple maser emitters are configured to emit electromagnetic waves at a frequency of 2.45 GHZ.

In other features, the lunar rover includes a lidar sensor coupled with the extension arm, the lidar sensor configured to emit light signals and measure reflected light that returns to the lidar sensor, wherein the controller is configured to determine a distance from the emitter array to the surface according to reflected light that returns to the lidar sensor, and adjust a power level of the emitter array according to the distance from the emitter array to the surface.

In other features, the lunar rover includes a signal detector configured to receive signals from multiple orientation antennas located in different directions with respect to the lunar rover body, wherein the controller is configured to determine a current position of the lunar rover body by triangulating signals received from the multiple orientation antennas, obtain a stored path specification identifying a previously sintered path on the surface, and control movement of the drive module and the at least one wheel to move the lunar rover body along the sintered path, according to the current position of the lunar rover body.

In other features, the lunar rover includes a servo motor coupled with at least one of the emitter array or the extension arm, wherein the controller is configured to inhibit movement of the at least one wheel to maintain the lunar rover body in a stationary position, and operate the servo motor to rotate an angle of the emitter array with respect to the surface, to sweep the at least one of the laser electromagnetic waves or the maser electromagnetic waves along the surface while the lunar rover body remains in the stationary position.

In other features, the controller is configured to control operation of the drive module to drive rotation of the at least one wheel to move the lunar rover body across the surface, and activate the emitter array to sinter lunar regolith particles along a path on the surface as the at least one wheel moves the lunar rover body across the surface.

In other features, the extension arm is a first extension arm coupled to a front portion of the lunar rover body, and the emitter array is a first emitter array, the lunar rover further comprising a second extension arm coupled to a rear portion of the lunar rover body, a second emitter array coupled to the second extension arm, wherein the controller is configured to control the second emitter array to emit at least one of laser electromagnetic waves or maser electromagnetic waves towards the surface to sinter lunar regolith particles on the surface.

A lunar rover control system includes a lunar rover body, at least one wheel coupled with the lunar rover body, a drive module coupled with the at least one wheel, the drive module configured to drive rotation of the at least one wheel over a surface, at least three orientation antennas located in different positions with respect to the surface, a signal detector coupled with the lunar rover body, the signal detector configured to receive signals from the at least three orientation antennas, and a controller electrically connected with the signal detector. The controller is configured to determine a current position of the lunar rover body by triangulating signals received from the at least three orientation antennas, obtain a stored path specification identifying a sintered path on the surface, and control movement of the drive module and the at least one wheel to move the lunar rover body along the sintered path, according to the current position of the lunar rover body.

In other features, the lunar rover includes an emitter array electrically connected with the controller, wherein the controller is configured to control the emitter array to emit at least one of laser electromagnetic waves or maser electromagnetic waves towards the surface to sinter lunar regolith particles on the surface, while the lunar rover body moves along the sintered path.

In other features, the at least three orientation antennas include ground-based orientation antennas located on the surface.

In other features, the at least three orientation antennas include satellite-based orientation antennas located in an orbital path.

A lunar rover emitter array apparatus includes an emitter array configured to couple with an extension arm of a lunar rover body, a detector element configured to detect an amount of lunar regolith particles on a surface over which the lunar rover body travels, and a controller electrically connected with the emitter array and the detection element. The controller is configured to determine whether the amount of lunar regolith particles detected by the detection element is greater than a sinter threshold value, in response to the amount of lunar regolith particles being greater than the sinter threshold value, activate the emitter array to emit at least one of laser electromagnetic waves or maser electromagnetic waves towards the surface to sinter lunar regolith particles on the surface, and in response to the amount of lunar regolith particles being less than the sinter threshold value, deactivate the emitter array to avoid sintering the lunar regolith particles.

In other features, the detector element includes a polarity detector configured to detect a polarity of the lunar regolith particles, and the controller is configured to determine the amount of lunar regolith particles according to the polarity of the lunar regolith particles detected by the polarity detector.

In other features, the detector element includes a lidar detector configured to emit light signals and determine an amount of reflected light that returns to the lidar detector, the controller is configured to determine the amount of lunar regolith particles according to the amount of reflected light that returns to the lidar detector.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
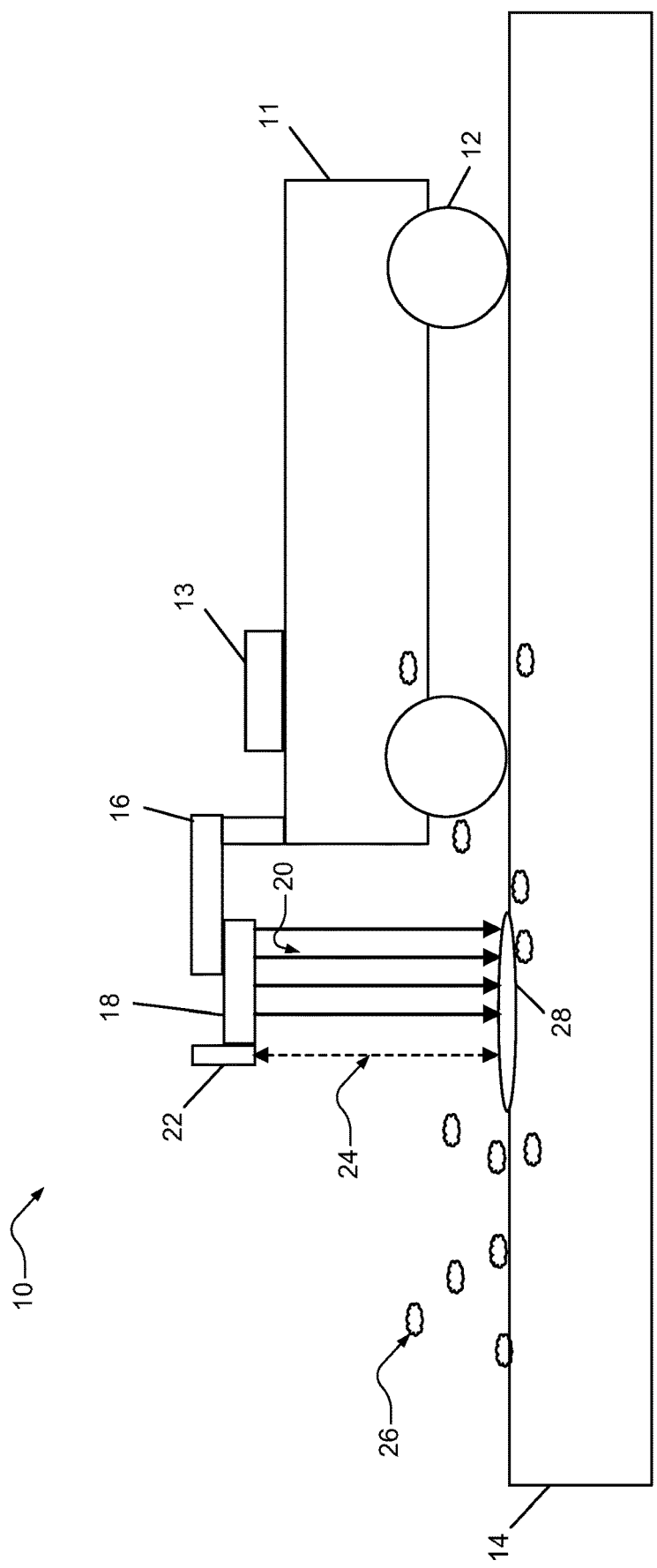
FIG. 1 is a block diagram illustrating an example lunar rover including an emitter array.

A key problem with lunar dust is that it is easily thrown up with even minimal movement, due to low gravity on the moon. Astronauts have reported that lunar regolith (lunar dust) is a problem as it accumulates all over during missions, and lunar regolith is considered as one of the most dangerous parts of operating on the moon.

For example, lunar regolith can damage machinery, can cause respiratory hazards for humans, etc. It is not feasible to avoid lunar regolith when traveling on the surface of the moon, and the abrasive nature of the lunar regolith can affect machine coatings, seals, gaskets, etc., and reduce reliability (such as damaging components of a lunar rover). Some lunar regolith (e.g., about 40%) holds a weak electric charge.

In some example embodiments described herein, a laser and/or maser emitter array may be used to clump together lunar dust particles (e.g., by sintering), before the lunar dust particles are thrown up from the lunar surface, such as by movement of a lunar rover.

As the lunar rover passes over surface terrain, the rover may measure a density of the lunar dust to determine whether or not to activate the emitter array. For example, targeted heating of the lunar surface up to, e.g., 1,500° C. or more (or less), may result in heavier, more clumped together particles, which are easier to filter and are thrown up from the lunar surface less due to their heavier mass.

As the lunar rover passes over the sintered surface, the rover is less likely to cause operational problems due to floating dust particles thrown up by wheels of the rover. In order to be energy-efficient, in various implementations the rover may automatically travel on previously sintered paths. This functionality may be enabled by, e.g., at least three suitably located surface or orbital transmission antennas visible to the rover, to determine a precise location of the rover via triangulation. The emitter arrays may function continuously or intermittently, depending on the environmental conditions (e.g., density of regolith, the nature of the path, the mission profile, etc.).

Clumping together of lunar dust particles before they are thrown up off the surface by the motion of the rover wheels, may be accomplished by sintering the dust particles using an emitter array including maser and/or laser emitters. For example, a maser may refer to microwave amplification by stimulated emission of radiation, such as a device that produces coherent electromagnetic waves through amplification by stimulated emission. Masers may generate electromagnetic waves at, for example, microwave frequencies, radio frequencies, and infrared frequencies.

A laser may refer to light amplification by stimulated emission of radiation, such as a device that emits light through a process of optical amplification based on the stimulated emission of electromagnetic radiation. The laser may emit light which is coherent. Spatial coherence allows a laser to be focused to a tight spot, and may also allow a laser beam to stay narrow over great distances. Lasers may have high temporal coherence, which allows them to emit light with a very narrow spectrum.

The lunar rover may include one or more emitter arrays, which may include one or more laser emitters, one or more maser emitters, or a combination of laser emitters and maser emitters. The emitter arrays may be coupled to a lunar rover body via an extension arm. For example, an extension arm may be located at a front of the lunar rover to position the emitter array over a surface in front of the rover, an extension arm may be located at a rear of the lunar rover to position the emitter array over a surface behind the rover, etc.

In various implementations, there may be an emitter array at the front of the rover and another emitter array at a rear of the vehicle. This arrangement may allow for sintering of lunar regolith particles on the surface twice as the lunar rover travels across the surface.

In some example embodiments, a lunar rover may limit travel to previously conditioned (e.g., sintered) paths on the surface (as a mission profile permits). The reuse of existing sintered paths may be enabled by a lunar positioning unit on the rover and, e.g., a sufficient number of suitably located surface or orbital antennas (e.g., orientation antennas) visible to the rover (such as three antennas, four antennas, more or less antennas, etc.). The lunar rover may determine its precise location based on triangulation of signals received from the surface or orbital antennas.

As described above, electromagnetic radiation may be used to sinter lunar regolith particles on the surface of the moon, such that the dust particles become clumped together, making them less likely to be thrown up and easier to filter by other dust-prevention methods. In various implementations, one or more sensors may be used to detect ambient dust (or dust that has been thrown up off the surface of the moon into a vacuum above the moon's surface).

The amount and/or density of lunar regolith may be used to modulate the intensity of the emitter power. For example, if there is a higher density or amount of ambient lunar regolith particles, more power may be used for sintering. If there is a lower density or amount of lunar regolith, less power may be used. In various implementations, if the density or amount of lunar regolith is below a specified sinter threshold value, the emitter may be turned off, to conserve energy by not sintering where there is not a lot of lunar regolith particles.

In some example embodiments, the rover may continuously or periodically measure the density of the lunar regolith as the rover travels across the surface, such as by using a detection element like a polarity detector or a lidar detector. At a certain density threshold (e.g., a specified sinter threshold value), the sensor (e.g., detection element) may communicate with a controller, which then activates the laser and/or maser emitters that point down and forward in front of the lunar rover (or behind the rover or any other suitable rover location), in order to sinter the lunar dust particles.

For example, the controller may control the emitter array to emit the appropriate intensity radiation via the laser and/or maser emitters, in order to sufficiently sinter lunar dust on the surface (or dust thrown up off the surface around the lunar rover). The laser and/or maser emitters may fuse or join the dust particles on the surface and around the rover, with a purpose of reducing or minimizing the dust kicked up by the wheels, as the rover passes over a conditioned path.

In various implementations, the sintering may be performed to generate permanent conditioning of the lunar surface. For example, as emitter-equipped rovers pass over the same surface terrain multiple times, a path may be sintered repeatedly, eventually resulting in heavily sintered paths where the lunar dust is minimized. This may be considered as a first step in building "roads" on the surface of the moon.

A controller may be configured to identify a current location of the lunar rover, in order to reuse existing, previously conditioned pathways. For example, using a triangulation-based navigation system to determine the current location of the vehicle, the lunar rover may be able to revisit "conditioned" areas. This arrangement may be accomplished by any combination of ground-based transmitter systems, satellite-based transmitter systems, etc. For example, in some embodiments there may be at least three transmitting systems.

Some example embodiments may provide one or more benefits, such as a net reduction of lunar dust particles thrown up by the lunar rover as it moves across the moon's surface. This may reduce the frequency of regular rover maintenance for issues related to lunar regolith, and may increase the usable lifetime of the rover as a result.

Some example embodiments may facilitate long-term construction of infrastructure on the moon. For example, fused passageways (e.g., sintered paths) used by lunar rovers on the lunar surface may be built up over time, with each passage of a rover hardening the conditioned path further and further. This may result in easier rover travel to and from different locations on the moon, as the path conditioning may be self-reinforcing over time.

The lunar environment is harsh due to extreme temperatures and lack of atmosphere, which means that some example embodiments may be hardened to perform in that difficult environment (e.g., the sensors, emitter arrays, etc., may be designed to operate without being damaged by the lunar regolith). The emitter arrays may use energy from the rover that could reduce its effective range, so in some example embodiments initial conditioning passes may likely travel shorter distances before the rover needs to recharge.

In various implementations, it may be possible to melt lunar soil in a short amount of time (e.g., minutes, etc.), using suitable frequencies. For example, a 2.45 GHz microwave signal may raise a temperature of the lunar regolith to, for example, a temperature in a range of 1,200° ° C. to 1,500° C., which may be sufficient to sinter the lunar regolith.

For example, a 15-kW to 50-kW class fiber laser operating at near-infrared may deliver a lot of energy, but energy requirements may be determined by a depth at which the lunar regolith should be melted in order for the conditioning to be effective. In various implementations, the power of the laser may be greater than 50 KW (or less than 15 KW), particularly if more powerful lasers are used. An example equation for energy to melt an area of radius r to a depth of d is provided below, where H is the Latent Heat of Fusion for the Lunar Dust, and ρ is the density:

$$Q = \rho dr^2 H$$

An example equation for determining power for melting lunar regolith is provided below, where v is the speed of the rover:

$$P = Qv$$

Beam control may be based on a multi-spectral targeting system, which uses, for example, an electro-optic/infra-red sensor with 360-degree azimuth rotations, with full hemispherical coverage field of regard. A common aperture may be used for the track sensor and a high-energy laser, to eliminate or otherwise reduce the parallax between the camera aperture and the laser and/or maser emitters.

In various implementations, a lidar emitter/detector device (e.g., lidar sensor) may be used to determine how far the surface is from the emitter array, in order to focus beams from the emitter array on the location of the surface (and the lunar regolith particles at the surface). Lidar may refer to light detection and ranging, or laser imaging, detection, and ranging, and may include a device configured to target an object or a surface with a laser, and measure the time for the reflected light to return to the receiver. For example, the rocky surface of the moon may cause rover components to bounce around, change distances relative to the surface based on movement of the rover, etc., and one or more motors or actuators may be used to focus the beam and correct for movement of the lunar rover.

The emitter arrays may be operated in any suitable arrangement relative to movement of the lunar rover. For example, in some cases the lunar rover may remain stationary while the laser and/or maser emitters are swept across the surface to sinter a path along the surface (e.g., using servo motors to rotate an angle of the emitter array while the lunar rover remains stationary).

In another example, the emitter array may be activated as the lunar rover moves across the surface, in order to sinter a path while the lunar rover is in motion. In various implementations, a combination of approaches may be used, such as sweeping the emitter array while the lunar rover is stationary in some locations and activating the emitter array while the lunar rover moves in other locations, sweeping the emitter array while the lunar rover moves across the surface, etc.

As described above, a detector element may be used to determine a density or amount of lunar regolith particles on a surface of the moon or around the lunar rover. For example, a polarity sensor may measure a charge of the lunar regolith particles kicked up around the lunar rover, to estimate a density. In various implementations, the total detected charge may be used to estimate the density, which may be increased to add an additional sixty percent (e.g., because only forty percent of lunar regolith particles may have a charge in some cases).

If the estimated density is below a threshold, the emitter array may be turned off to avoid wasting energy on areas where there is not much lunar regolith to sinter. As another example, a lidar detector could be used for a direct measurement of lunar dust around the lunar rover. As the lidar light is scattered by the lunar dust, the intensity of the light reflection may be reduced due to the scattering, which may allow for estimating a density of the lunar dust based on the amount of scattering and the intensity of the corresponding light reflection. In various implementations, a simulation or computed model may be used, based on how much dust is made ambient by the motion of the rover as a function of the speed of the rover's wheels, the rover weight, and the depth of the regolith, to infer an estimate of the regolith depth. Based on the estimate of the regolith depth, a controller may adjust operational parameters in order to control the emitter arrays for a suitable amount of sintering. In some example embodiments, a polarity detector may measure the charge of the regolith, and at the same time, based on an amount of accumulated dust on the rover, sends a signal to the controller in order to estimate the ambient dust density.

FIG. 1 is a block diagram illustrating an example of a lunar rover 10 including an emitter array. As shown in FIG. 1, the lunar rover 10 includes a rover body 11. The rover body 11 may include, for example, a frame, a chassis, lunar rover operational components, batteries, solar panels, etc.

Wheels 12 are coupled with the rover body 11. FIG. 1 illustrates two sets of wheels from the side view, although other embodiments may include more or less wheels. In various implementations, the wheels 12 may be covered by one or more tracks, etc.

The rover body 11 includes a drive module (or drive unit) coupled to drive rotation of the wheels 12 to move the lunar rover 10 across the surface 14 (e.g., a lunar surface of the moon). The drive unit may include any suitable unit for driving rotation of the wheels 12, such as a motor (e.g., and electric motor) coupled to a solid axle between two wheels, split axles for each wheel, etc. In various implementations, a gyroscope may be included for single-wheeled or double-wheeled axles. Details of example embodiments described herein may be applied to rovers of any suitable dimensions, and may be used for hand-held rovers, very larger rover "trucks", etc.

An extension arm 16 is coupled to the rover body 11, and an emitter array 18 is coupled to the extension arm 16. Although FIG. 1 illustrates only one extension arm 16 and one emitter array 18 located at a front of the rover body 11, in other embodiments there may be an extension arm and emitter array located at a rear of the rover body 11, extension arms and emitter arrays located at both a front of the rover body 11 and a rear of the rover body 11, etc.

The emitter array 18 includes one or more laser emitters and/or maser emitters configured to emit beams 20 of coherent electromagnetic radiation to sinter lunar regolith particles 26 and create a sintered material 28. For example, lunar regolith particles 26 may be present on the surface 14, and may be thrown from the surface 14 due to, e.g., movement of the wheels 12 along the surface 14. The lunar regolith particles 26 in FIG. 1 are not illustrated at scale, and are normally much smaller relative to the size of the lunar rover 10.

The beams 20 of coherent electromagnetic radiation may melt the lunar regolith particles 26 that absorb the beams 20, to create the sintered material 28. For example, the sintered material 28 may include melted lunar regolith particles 26 that have fused together due to energy from the beams 20, such the sintered material forms a larger clump of material on the surface 14.

The sintered material 28 may be less likely to be thrown up off of the surface 14 as the wheels 12 of the lunar rover 10 move along the surface 14 (e.g., compared to the lunar regolith particles 26), and may be easier to filter compared to the smaller lunar regolith particles 26. Therefore, as more of the lunar regolith particles 26 are sintered, it may create a conditioned path that is easier for the lunar rover 10 to move across without encountering as many lunar regolith particles 26 thrown up off of the surface 14.

The lunar rover 10 includes a detector element 22 coupled to the extension arm 16. The detector element 22 may be used to determine an amount of lunar regolith particles 26 that are present on the surface 14 and/or around the lunar rover 10.

For example, the detector element 22 may include a polarity detector configured to detect a polarity (e.g., amount of charge) of the lunar regolith particles 26. The detected polarity may be used to estimate a density or amount of the lunar regolith particles 26.

In various implementations, the lunar rover 10 may include a controller 13 electrically coupled with the emitter array 18 and the detector element 22. The controller 13 may be configured to receive the detected polarity of the lunar regolith particles 26 from the detector element 22, and determine or estimate an amount or density of the lunar regolith particles 26 based on the detected polarity (e.g., where a higher detected polarity is indicative of a higher density of lunar regolith particles 26).

The controller 13 may be configured to control operation of the emitter array 18 according to the determined or estimated amount of the lunar regolith particles 26. For example, the controller 13 may control the emitter array 18 to output higher intensity beams 20 in response to a determination that there is a higher density of lunar regolith particles 26, and may control the emitter array 18 to output lower intensity beams 20 in response to a determination that there is a lower density of lunar regolith particles 26.

In some example embodiments, the controller 13 may compare the estimated or determined density or amount of lunar regolith particles 26 to a threshold, to determine whether to activate the emitter array 18 at all. For example, if the estimated or determined density or amount of lunar regolith particles 26 is below a specified sinter threshold, the controller 13 may turn off the emitter array 18 to avoid wasting energy when there are few lunar regolith particles 26 to sinter.

As another example, the detector element 22 may include a lidar emitter/detector. The lidar emitter/detector may be configured to emit a light beam 24, and measure an amount of light reflected back to the lidar emitter/detector. The controller 13 may be configured to estimate or determine an amount or density of lunar regolith particles 26 according to the reflected light. For example, a higher density of lunar regolith particles 26 may scatter the light more (leading to less reflected light returning to the lidar emitter/detector), while a lower density of lunar regolith particles 26 may scatter the light less (leading to more reflected light returning to the lidar emitter/detector).

Figure 2:
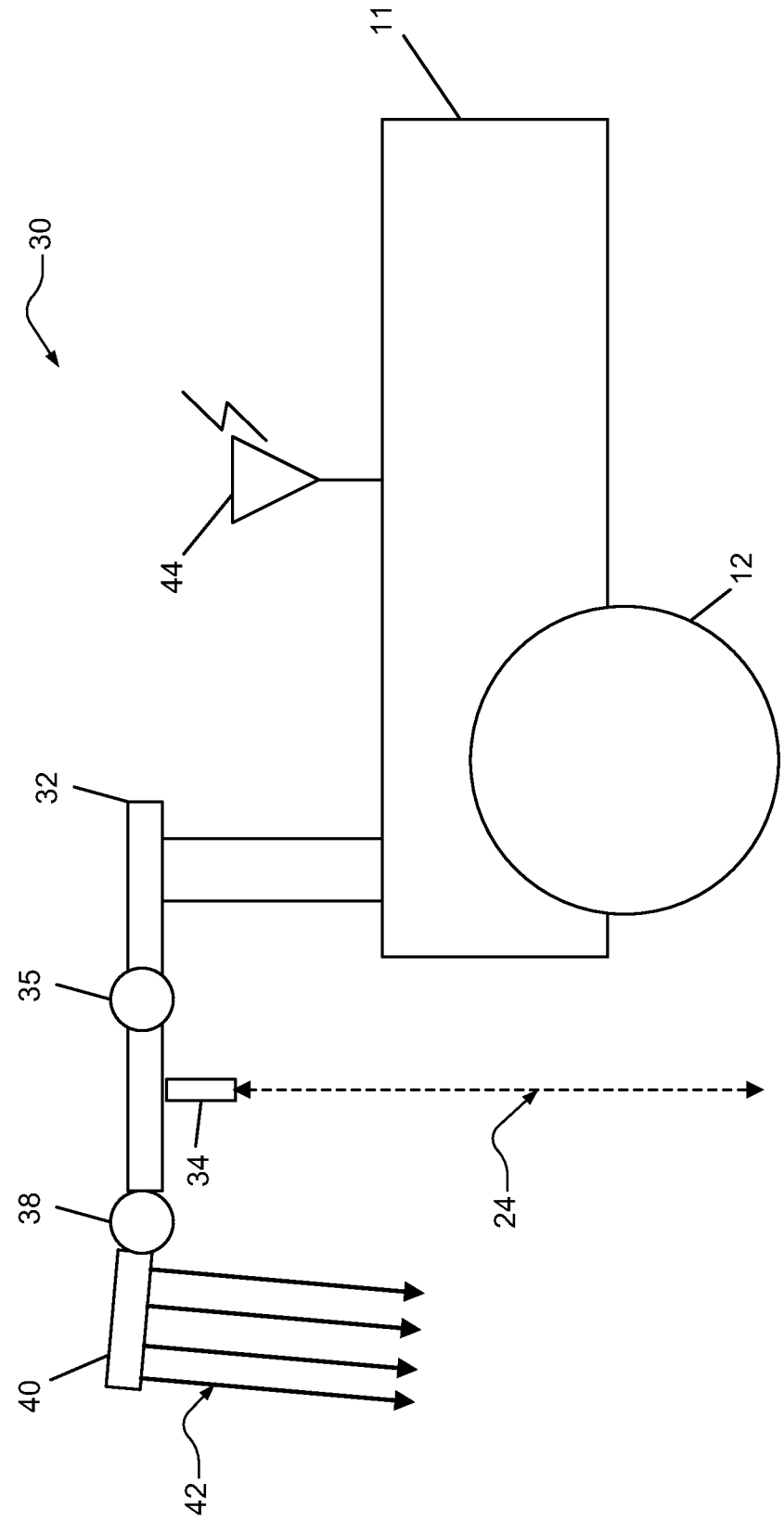
FIG. 2 is a block diagram illustrating an example emitter array coupled with an extension arm via servo motors.

FIG. 2 is a block diagram illustrating an example emitter array coupled with an extension arm via servo motors. As shown in FIG. 2, an emitter array 40 is coupled with the extension arm 32 via a first servo motor 35 and a second servo motor 38. For example, the first servo motor 35 may be configured to extend or retract the emitter array 40 in a horizontal direction, while the second servo motor 38 is configured to adjust an angle of the emitter array 40.

In various implementations, the controller 13 may be configured to control operation of the first servo motor 35 and the second servo motor 38, to control a position and orientation of the emitter array 40. For example, the controller 13 may operate the first servo motor 35 and the second servo motor 38 to sweep the beams 42 of electromagnetic radiation from laser and/or maser emitters across a portion of the surface 14.

In various implementations, the lunar rover 30 may remain stationary while the emitter array 40 is extended, rotated, etc., to sweep the beams 42 across the portion of the surface 14. In other example embodiments, the wheels 12 may rotate to move the lunar rover 30 across the surface 14, while the emitter array 40 remains stationary (or is rotated or extended via the first servo motor 35 and the second servo motor 38).

Although FIG. 2 illustrates a first servo motor 35 and a second servo motor 38, it should be apparent that in other embodiments the lunar rover 30 may include more or less servo motors, servo motors at other positions with respect to the extension arm 32 or the rover body 11, other types of movement elements for controlling a position and/or orientation of the emitter array 40 (such as an actuator), etc.

As shown in FIG. 2, the lunar rover 30 includes a lidar sensor 34 coupled to the extension arm 32. The lidar sensor 34 is configured to emit a light beam 24 toward the surface 14, to determine how far the emitter array 40 is from the surface 14.

For example, the lidar sensor 34 may measure an amount of time it takes for the light beam 24 to be reflected back to the lidar sensor 34, to determine a distance travelled by the light beam 24. The controller 13 may be electrically connected with the lidar sensor 34, to receive the determined distance travelled by the light beam 24 (or to determine the distance based on a time value transmitted from the lidar sensor 34 to the controller 13).

The controller 13 may be configured to adjust operation of the emitter array 40 according to the determined distance of the emitter array 40 from the surface 14. For example, the controller 13 may controller 13 may adjust the emitter array 40 such that the beams 42 of electromagnetic radiation are focused at the distance of the surface 14. The controller 13 may be configured to adjust a power level of the emitter array 40 based on the determined distance, such as by increasing the power of the beams 42 when the emitter array 40 is farther from the surface 14, and decreasing the power of the beams 42 when the emitter array 40 is closer to the surface 14.

As shown in FIG. 2, the lunar rover 30 includes a signal detection element 44. The signal detection element 44 is configured to receive signals from multiple orientation antennas, in order to determine a current location of the lunar rover 30. For example, at least three ground-based or orbital satellite-based transponder antennas may transmit periodic signals, and the signal detection element 44 may receive the signals to determine a location of the lunar rover 30 via, e.g., triangulation of the multiple received signals, such as by determining a distance from each transponder antenna based on a time each signal is received at the signal detection element 44 (e.g., similar to a global positioning system, etc.).

The signal detection element 44 may be a receiver antenna. As described further below, in various implementations the position of the lunar rover 30 may be used to guide the lunar rover along a previously conditioned path (e.g., a path that has already been sintered before).

Figure 3:
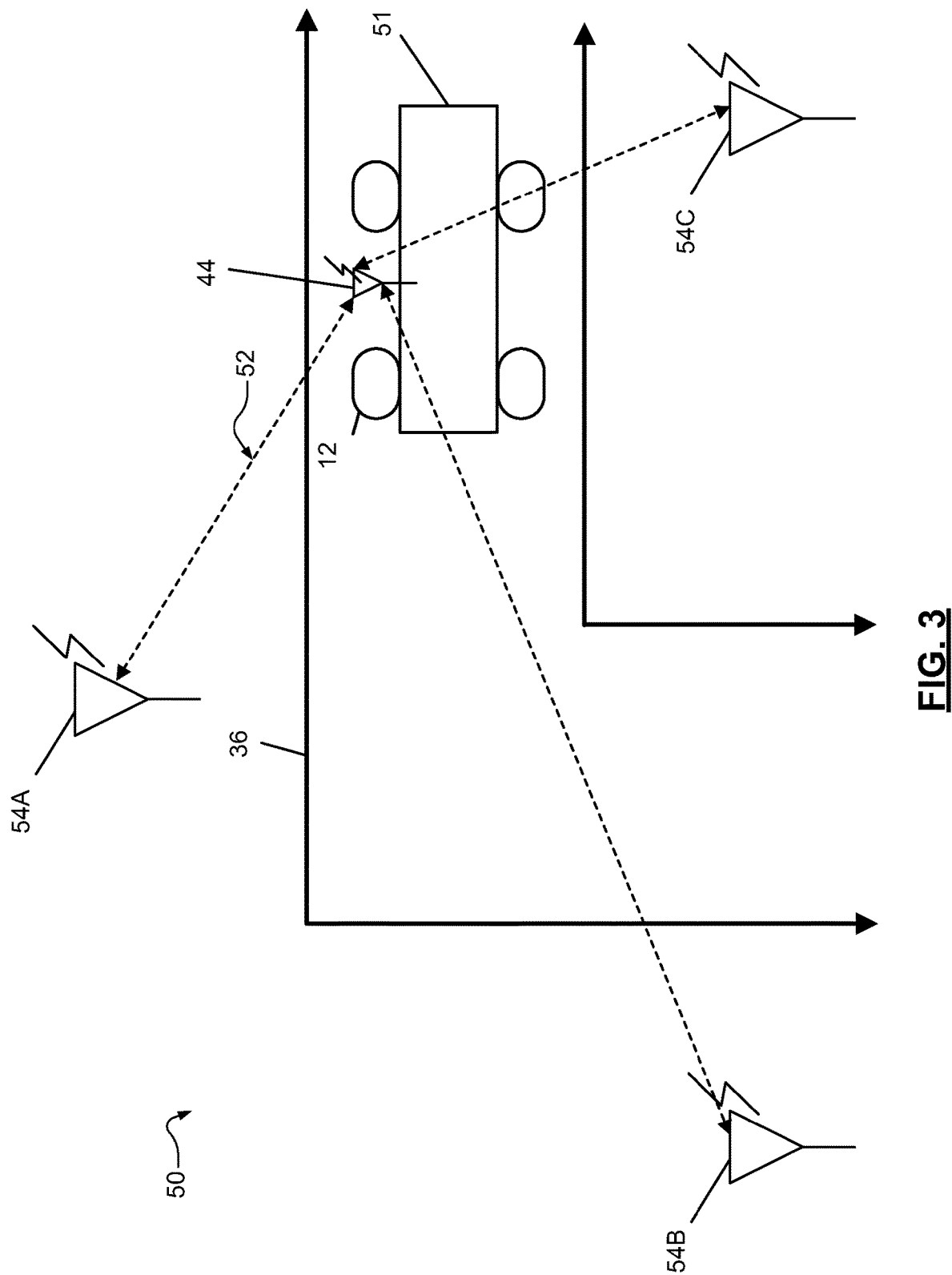
FIG. 3 is a block diagram illustrating a lunar rover traveling along a sintered path by triangulating signals from multiple orientation antennas.

FIG. 3 is a block diagram illustrating a lunar rover 51 traveling along a sintered path 36 by triangulating signals from multiple orientation antennas. As shown in FIG. 3, the lunar rover 51 includes multiple wheels 20 to move the lunar rover 51 along the path 36.

The path 36 may be a conditioned path that has been sintered at least once before. In various implementations, sintering may be performed multiple times along the path 36 in order to create a harder surface including more sintered material 28, which allows the lunar rover 51 to travel without kicking up as many lunar regolith particles 26 on the path 36, thereby protecting the lunar rover 51 so it requires less frequent maintenance and is less susceptible to damage from lunar regolith particles.

The path 36 may be stored in a memory accessible by the controller 13. For example, a planned path layout may be mapped ahead of time by a mission designer, etc., such that the planned path layout is followed over and over by the rovers to create a conditioned path.

As another example, information may be stored regarding where rovers have traveled and sintered material previously, and a conditioned path map may be generated and updated over time based on known locations that have been previously sintered by lunar rovers. For each rover, a history of its past paths could be maintained on the rover, as well as on computing elements located separate from the rover (e.g., a data center that records all the paths for all the rovers). This data could be used to design future missions that aim to re-use previously conditioned paths. For example, one or more data centers may be configured for monitoring and management of one or more rovers. The data center(s) may enable mission profiling, management, design, etc.

The controller 13 may be configured to obtain a current location of the lunar rover 51 based on signals received at the signal detection element 44. For example, the signal detection element 44 may receive a first orientation signal from a first orientation antenna 54A, a second orientation signal from a second orientation antenna 54B, and a third orientation signal from a third orientation antenna 54C.

Each of the first orientation antenna 54A, the second orientation antenna 54B, and the third orientation antenna 54C may be a ground-based antenna (e.g., a transponder antenna stationed on a surface of the moon), or a satellite-based antenna (e.g., a transponder antenna on a satellite orbiting the moon, or earth). Although FIG. 3 illustrates three orientation antennas, in other embodiments there may be more or less orientation antennas.

The controller 13 may be configured to use the current location of the lunar rover 51 to control movement of the lunar rover 51 along the path 36. For example, the controller 13 may identify a current position of the lunar rover 51 with respect to the path 36, and a direction of the path 36 moving forward from the current position.

The controller 13 may then control, e.g., a steering mechanism, etc., to move the lunar rover in the direction of the path 36 based on the current position of the lunar rover 51. In this manner, the lunar rover 51 may be controlled to travel along the path 36 that has been previously sintered, to reduce harm to the lunar rover 51 due to lunar regolith particles 26.

Figure 4:
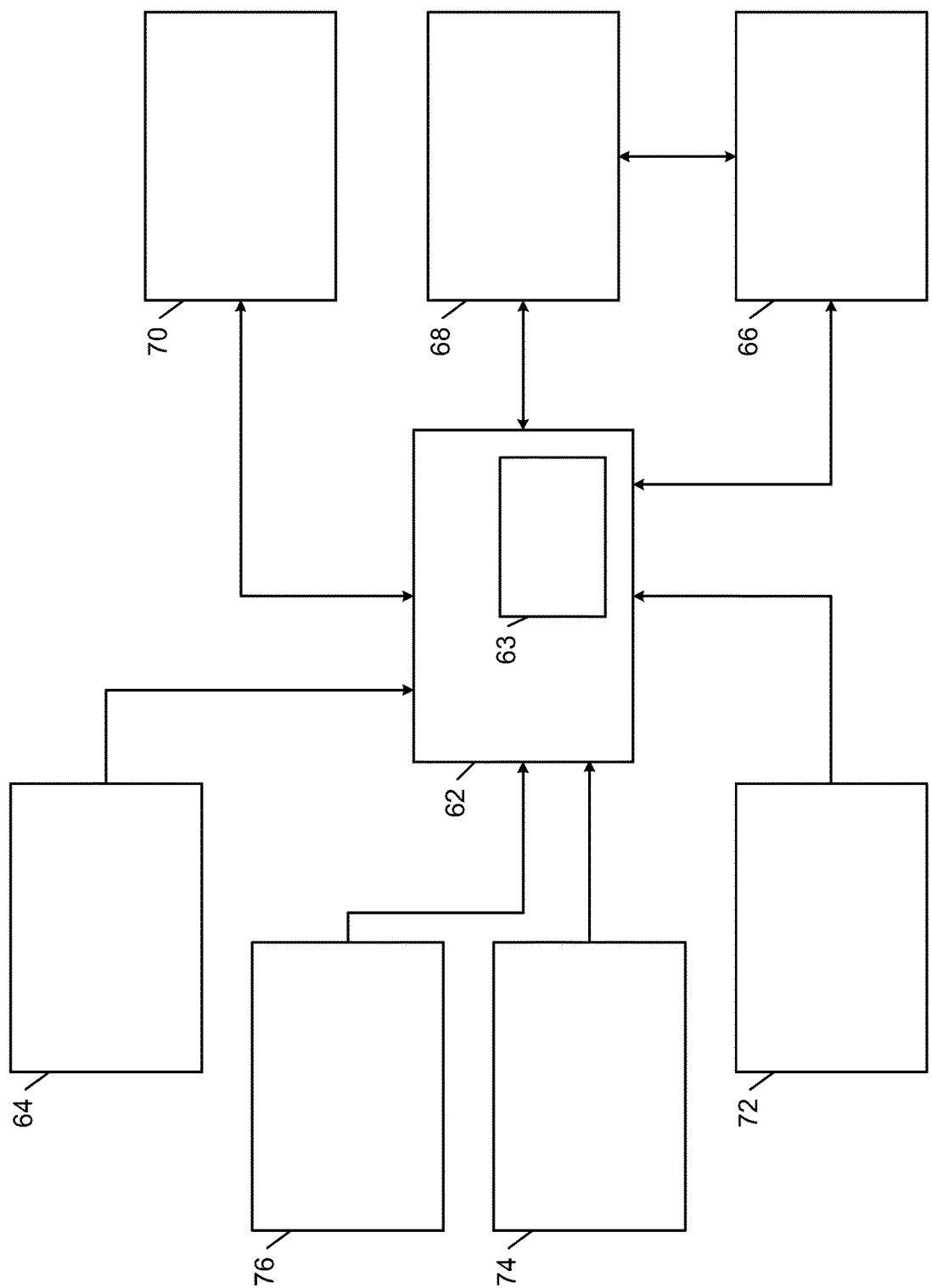
FIG. 4 is a block diagram illustrating an example controller connected with sensors and other components of a lunar rover.

FIG. 4 is a block diagram illustrating an example controller connected with sensors and other components of a lunar rover. As shown in FIG. 4, the controller 62 receives power from the power supply 70, to operation of the controller 62. The controller 62 may be similar to the controller 13 illustrated in FIG. 1.

The controller 62 is configured to control operation of a laser/maser emitter array 66. For example, the controller 62 may operate the laser/maser emitter array 66 to emit beams 20 of coherent electromagnetic radiation to sinter lunar regolith particles 26. The controller 62 may also control one or more servo motors 68 to control a position and/or orientation of the laser/maser emitter array 66 with respect to the surface 14.

A polarity sensor 76 is electrically connected with the controller 62. The polarity sensor 76 may detect a polarity of the lunar regolith adjacent the rover body 11, or on the surface 14, and provide the detected polarity to the controller 62. The controller 62 may then adjust the laser/maser emitter array 66 according to the detected polarity (e.g., by estimating or determining an amount or density of the lunar regolith particles 26 based on the detected polarity, as described above).

A lidar emitter/detector 74 is electrically connected with the controller 62. The lidar emitter/detector 74 may be configured to determine a distance from the laser/maser emitter array 66 to the surface 14. The lidar emitter/detector 74 may be configured to determine an amount or density of lunar regolith particles 26 adjacent the lunar rover 10 or on the surface 14, based on scattering of the emitted light by the lunar regolith particles 26 according to an intensity of reflected light returning to the lidar emitter/detector 74. In various implementations, lidar sensors may be used for two different purposes: measuring the distance of the laser/maser emitter arrays from the lunar surface, as well as measuring the density of ambient lunar dust particles. In the latter case, extinction in the reflected signal may be used to infer the density of ambient dust particles.

FIG. 4 also illustrates temperature sensors 72. The temperature sensors 72 may be used for monitoring temperature of components of the lunar rover, such as batteries, etc. Although FIG. 4 illustrates one example embodiment of components electrically coupled with the controller 62, other embodiments may include more or less components, components in different connection arrangements, etc.

As shown in FIG. 4, the controller 62 includes computer-executable instructions 63. The computer-executable instructions 63 may be stored in memory associated with the controller 62, stored in other memory that is accessed by the controller 62 to execute the computer-executable instructions 63, etc. For example, the computer-executable instructions 63 may include instructions for controlling operation of the emitter array 18, controlling movement of the lunar rover 51 along a path 36, etc.

An example process for controlling operation of the emitter array 18, which may be stored in the computer-executable instructions 63, is described further below with reference to FIG. 5. An example process for controlling movement of the lunar rover 51 along a path 36, which may be stored in the computer-executable instructions 63, is described further below with reference to FIG. 6.

Figure 5:
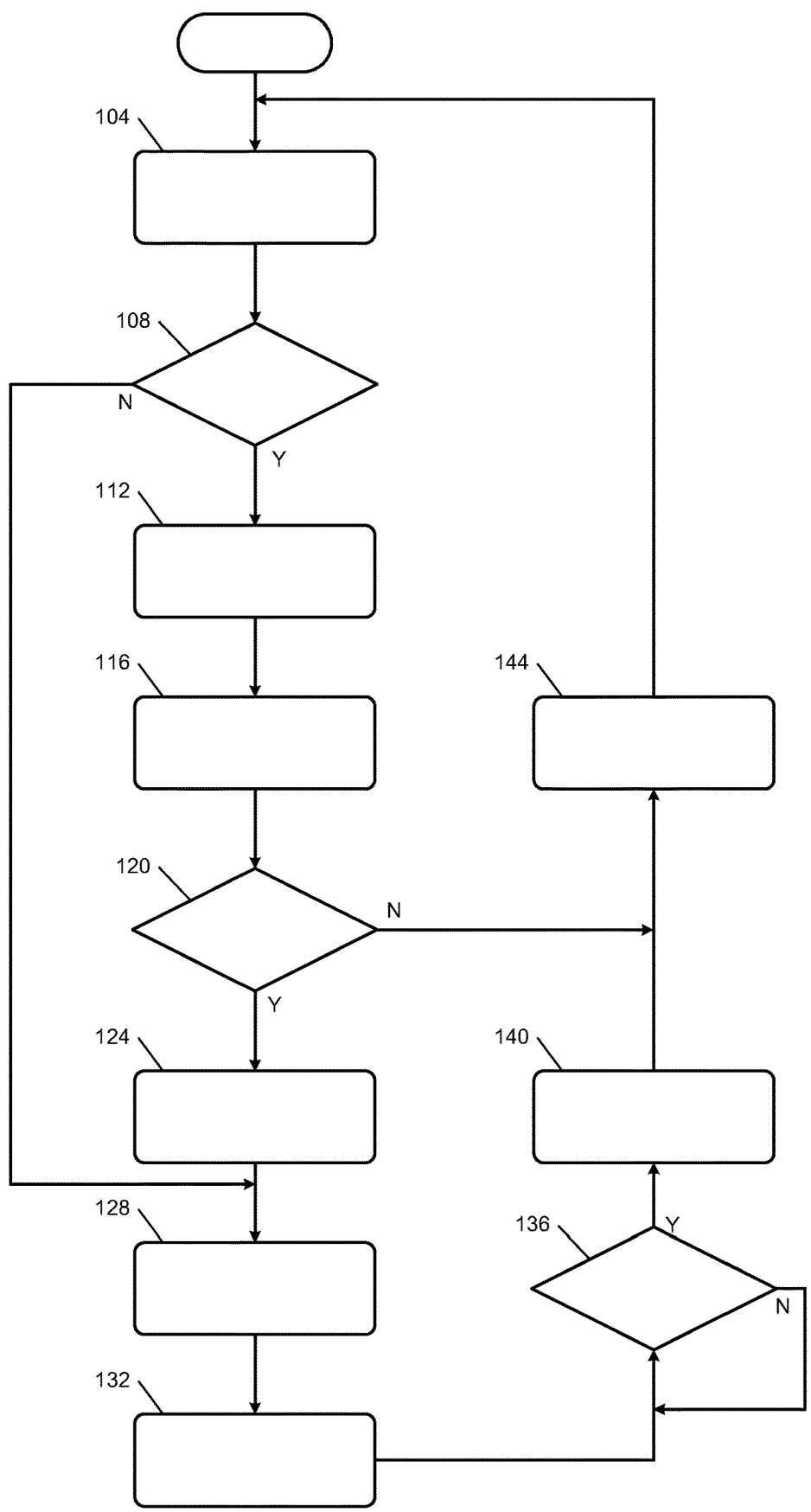
FIG. 5 is a flow chart depicting an example process for sintering lunar regolith particles using a laser or maser emitter array.

FIG. 5 is a flow chart depicting an example process for sintering lunar regolith particles using a laser or maser emitter array. The process may be performed by, e.g., the controller 62 of FIG. 4. For example, the controller 62 may execute the computer-executable instructions 63 to implement steps of the process illustrated in FIG. 5.

At 104, the controller is configured to detect a distance from the emitter array to a surface of the moon. For example, the controller may receive a distance value from a lidar detector configured to emit light towards the surface and measure a time that it takes for the reflected light to return to the lidar detector.

The controller is configured to determine at 108 whether polarity detection is activated. For example, in some embodiments a polarity of the lunar regolith may be used to estimate an amount or density of the lunar regolith, to adjust an intensity of the beams emitted by the laser and/or maser emitters (or to determine whether or not to activate the laser and/or maser emitters).

If the controller determines at 108 that polarity detection has been activated, the controller is configured to detect a polarity of the lunar regolith using the polarity sensor, at 112. The controller is then configured to determine an amount (or density) of the lunar regolith present adjacent the lunar rover, based on the detected polarity, at 116.

At 120, the controller is configured to determine whether the estimated or determined amount of lunar regolith is greater than a threshold. If not, the controller proceeds to 144 to move the lunar rover to the next location on the path, without activating the emitter array. For example, the controller may determine that there is enough lunar regolith present to waste energy trying to sinter it.

If the controller determines at 120 that the amount of lunar regolith present is greater than the threshold, the controller is configured to set the emitter array power level based on the detected polarity, at 124. For example, the controller may increase a power level of the emitter array if there is more lunar regolith present, decrease the power level of the emitter array if there is less lunar regolith present, etc.

Although FIG. 5 illustrates determining an amount of regolith present based on a polarity detection, in other embodiments other suitable techniques may be used to determine an amount of density of the lunar regolith (such as a lidar emitter/detector, etc.). In some example embodiments, when the amount of lunar regolith present is over the threshold, the controller may simply activate the emitter array, without adjusting a power level based on the determined amount of lunar regolith.

After setting the emitter array power level at 124, or determining that polarity detection (or lidar detection) is not being used to determine an amount of lunar regolith present adjacent the lunar rove, the controller is configured at 128 to adjust an emitter power, angle, focus, etc., based on the distance to the surface (such as by the distance determine at 104 in FIG. 5). For example, the controller may adjust a focus of the laser and/or maser emitters so the beams of electromagnetic radiation are absorbed by lunar regolith particles at the surface.

At 132, the controller is configured to activate the emitter array to sinter the lunar regolith. The controller is then configured to determine at 136 whether a sinter period has expired. For example, the controller may be configured to activate the emitter array for a specified period of time (e.g., one minute, three minutes, ten minutes, etc.), in order to melt the lunar regolith particles. The controller may cause the emitter arrays to function continuously or intermittently (e.g., pulsed), depending on the environmental conditions, such as a density of regolith, a nature of the path, a mission profile, etc.

After the time period has elapsed at 136, the controller is configured to deactivate the emitter array at 140. The controller is then configured to move the lunar over to a next location on the path at 144, to determine whether sintering should be performed at the next location.

Figure 6:
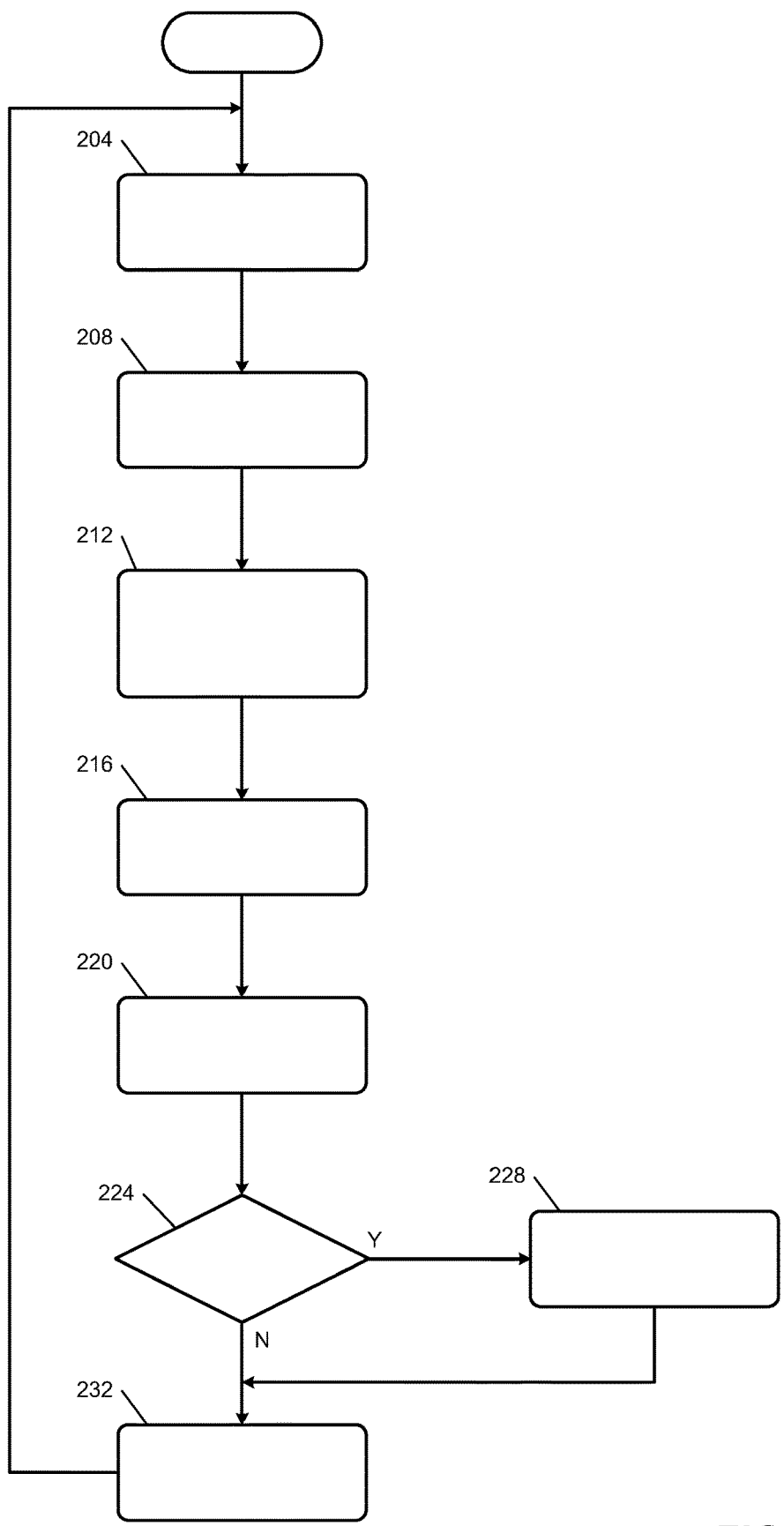
FIG. 6 is a flow chart depicting an example process for controlling movement of a lunar rover along a sintered path.

FIG. 6 is a flow chart depicting an example process for controlling movement of a lunar rover along a sintered path. The process may be performed by, e.g., the controller 62 of FIG. 4. For example, the controller 62 may execute the computer-executable instructions 63 to implement steps of the process illustrated in FIG. 6.

At 204, the controller is configured to obtain existing path map coordinates. For example, the controller may obtain a map stored in memory that identifies conditioned paths that have already been sintered by lunar rovers. The controller then receives a position signal from at least three signal sources at 208.

At 212, the controller is configured to determine a current rover position based on the received positioning signals. For example, the controller may receive signals from multiple orientation antennas (such as via a signal detection element 44), and triangulate the signals to determine a current position of the rover.

The controller is configured to identify a direction of the path based on a current location of the rover, at 216. For example, the controller may access the map to identify which way the path continued at the current location of the rover. At 220, the controller is configured to determine whether sintering is requested at the current location.

For example, in some missions, the lunar rover may be operated to further sinter portions of the existing path. In other missions, the lunar rover may be instructed to simply travel along the path without performing sintering operations. If the controller determines at 224 that sintering is requested, the controller activates the emitter array to sinter the path surface at 228. If the controller determines at 224 that sintering is not requested, or after sintering at 228, the controller is configured to move the lunar rover in the direction of the path at 232.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer. In various implementations, a controller may include an ASIC, an FPGA, etc.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A lunar rover comprising:
   a lunar rover body;
   at least one wheel coupled with the lunar rover body;
   a drive module coupled with the at least one wheel, the drive module configured to drive rotation of the at least one wheel over a surface;
   an extension arm coupled to the lunar rover body;
   an emitter array coupled to the extension arm;
   a lidar sensor coupled with the extension arm, the lidar sensor configured to emit light signals and measure reflected light that returns to the lidar sensor; and
   a controller electrically connected with the emitter array, the controller configured to,
      control the emitter array to emit at least one of laser electromagnetic waves or maser electromagnetic waves towards the surface to sinter lunar regolith particles on the surface,
      determine a distance from the emitter array to the surface according to reflected light that returns to the lidar sensor; and
      adjust a power level of the emitter array according to the distance from the emitter array to the surface.

2. The lunar rover of claim 1, wherein the emitter array includes multiple laser emitters configured to emit coherent light.

3. The lunar rover of claim 2, wherein the multiple laser emitters are configured to emit light with at a power in a range of 15 KW to 50 KW.

4. The lunar rover of claim 1, wherein the emitter array includes multiple maser emitters configured to emit electromagnetic waves have at least one of a microwave frequency, a radio frequency or an infrared frequency.

5. The lunar rover of claim 4, wherein the multiple maser emitters are configured to emit electromagnetic waves at a frequency of 2.45 GHz.

6. The lunar rover of claim 1, further comprising a signal detector configured to receive signals from multiple orientation antennas located in different directions with respect to the lunar rover body,
   wherein the controller is configured to:
      determine a current position of the lunar rover body by triangulating signals received from the multiple orientation antennas;
      obtain a stored path specification identifying a previously sintered path on the surface; and
      control movement of the drive module and the at least one wheel to move the lunar rover body along the sintered path, according to the current position of the lunar rover body.

7. The lunar rover of claim 1, further comprising a servo motor coupled with at least one of the emitter array or the extension arm,
   wherein the controller is configured to:
      inhibit movement of the at least one wheel to maintain the lunar rover body in a stationary position; and
      operate the servo motor to rotate an angle of the emitter array with respect to the surface, to sweep the at least one of the laser electromagnetic waves or the maser electromagnetic waves along the surface while the lunar rover body remains in the stationary position.

8. The lunar rover of claim 1, wherein the controller is configured to:

control operation of the drive module to drive rotation of the at least one wheel to move the lunar rover body across the surface; and activate the emitter array to sinter lunar regolith particles along a path on the surface as the at least one wheel moves the lunar rover body across the surface.

9. The lunar rover of claim 1, wherein the extension arm is a first extension arm coupled to a front portion of the lunar rover body, and the emitter array is a first emitter array, the lunar rover further comprising:

a second extension arm coupled to a rear portion of the lunar rover body; and a second emitter array coupled to the second extension arm, wherein the controller is configured to control the second emitter array to emit at least one of laser electromagnetic waves or maser electromagnetic waves towards the surface to sinter lunar regolith particles on the surface.

10. A lunar rover of claim 1, further comprising:

a lunar rover body:

at least one wheel coupled with the lunar rover body;

a drive module coupled with the at least one wheel, the drive module configured to drive rotation of the at least one wheel over a surface;

an extension arm coupled to the lunar rover body;

an emitter array coupled to the extension arm;

a detector element configured to detect an amount of lunar regolith particles on the surface; and a controller electrically connected with the emitter array, wherein the controller is configured to:

control the emitter array to emit at least one of laser electromagnetic waves or maser electromagnetic waves towards the surface to sinter lunar regolith particles on the surface;

determine whether the amount of lunar regolith particles detected by the detection element is greater than a sinter threshold value;

activate the emitter array to sinter the lunar regolith particles in response to the amount of lunar regolith particles being greater than the sinter threshold value; and deactivate the emitter array to avoid sintering the lunar regolith particles in response to the amount of lunar regolith particles being less than the sinter threshold value.

11. The lunar rover of claim 10, wherein:

the detector element includes a polarity detector configured to detect a polarity of the lunar regolith particles; and the controller is configured to determine the amount of lunar regolith particles according to the polarity of the lunar regolith particles detected by the polarity detector.

12. The lunar rover of claim 10, wherein:

the detector element includes a lidar detector configured to emit light signals and determine an amount of reflected light that returns to the lidar detector; and the controller is configured to determine the amount of lunar regolith particles according to the amount of reflected light that returns to the lidar detector.

13. A lunar rover emitter array apparatus comprising:

an emitter array configured to couple with an extension arm of a lunar rover body;

a detector element configured to detect an amount of lunar regolith particles on a surface over which the lunar rover body travels; and a controller electrically connected with the emitter array and the detection element, wherein the controller is configured to:

determine whether the amount of lunar regolith particles detected by the detection element is greater than a sinter threshold value;

in response to the amount of lunar regolith particles being greater than the sinter threshold value, activate the emitter array to emit at least one of laser electromagnetic waves or maser electromagnetic waves towards the surface to sinter lunar regolith particles on the surface; and in response to the amount of lunar regolith particles being less than the sinter threshold value, deactivate the emitter array to avoid sintering the lunar regolith particles.

14. The lunar rover emitter array apparatus of claim 13, wherein:

the detector element includes a polarity detector configured to detect a polarity of the lunar regolith particles; and the controller is configured to determine the amount of lunar regolith particles according to the polarity of the lunar regolith particles detected by the polarity detector.

15. The lunar rover emitter array apparatus of claim 13, wherein:

the detector element includes a lidar detector configured to emit light signals and determine an amount of reflected light that returns to the lidar detector; and the controller is configured to determine the amount of lunar regolith particles according to the amount of reflected light that returns to the lidar detector.

* * * * *